United States Patent
Joko et al.

[11] Patent Number: 6,054,058
[45] Date of Patent: Apr. 25, 2000

[54] METHOD FOR TREATING WATER WHICH CONTAINS NITROGEN COMPOUNDS

[75] Inventors: Isao Joko; Hiroyuki Asada; Takaaki Tokutomi, all of Kanagawa, Japan

[73] Assignee: Kurita Water Industries, Ltd., Japan

[21] Appl. No.: 09/025,333

[22] Filed: Feb. 18, 1998

[51] Int. Cl.⁷ ....................................................... C02F 1/72
[52] U.S. Cl. ...................... 210/763; 210/754; 210/759; 210/903
[58] Field of Search .................................. 210/758, 759, 210/763, 903, 754, 756

[56] References Cited

U.S. PATENT DOCUMENTS

| | | | |
|---|---|---|---|
| 3,929,600 | 12/1975 | Hiasa et al. | 204/149 |
| 4,137,166 | 1/1979 | Heimberger et al. | 210/756 |
| 4,307,067 | 12/1981 | Tagawa et al. | 423/224 |
| 4,879,047 | 11/1989 | Jackson | 210/759 |
| 5,772,897 | 6/1998 | Hancock et al. | 210/756 |

FOREIGN PATENT DOCUMENTS

| | | |
|---|---|---|
| 2-002896 | of 0000 | Japan . |
| 80-014720 | of 0000 | Japan . |
| 53-82050 | 7/1978 | Japan . |
| 58-112089 | 7/1983 | Japan . |
| 59-00377 | 1/1984 | Japan . |
| 5915708 | 4/1984 | Japan . |
| 0910780 | 1/1997 | Japan . |

*Primary Examiner*—David A. Simmons
*Assistant Examiner*—Frank M. Lawrence
*Attorney, Agent, or Firm*—Morrison Law Firm

[57] ABSTRACT

Waste water containing nitrogen compounds is processed by adding an oxidant to the waste water. The oxidant may be one or more of a chlorine oxidant or hydrogen peroxide. The oxidant breaks down the nitrogen compounds through a breakpoint reaction. The partially processed water then is contacted with a metal peroxide catalyst. The metal peroxide breaks down and removes excess oxidant. The reaction may be carried out at normal temperature and pressure.

13 Claims, 2 Drawing Sheets

METHOD FOR TREATING WATER WHICH CONTAINS NITROGEN COMPOUNDS

BACKGROUND OF THE INVENTION

The present invention relates to a method for treating water which contains nitrogen compounds. More specifically, the present invention relates to a treatment method for water which contains nitrogen compounds, wherein chlorine oxidants or hydrogen peroxide is added. Nitrogen compounds are efficiently removed by oxidative destruction to nitrogen gas. At the same time, chemical oxygen demand (COD) is reduced.

Waste sources of nitrogen compounds include proteins, which are used in livestock feed production industries; nitric acid, which is used in inorganic pigment production; ammonia, nitric acid, sodium nitrate, and sodium nitrite, which are used in surface processing steps in metal products production industries and electronic machinery appliance manufacturing; and the like. When released into water, nitrogen compounds may cause eutrophication. If these nitrogen compounds are released as nitrogen oxides into the atmosphere, they are dangerous to health as primary pollutants. Furthermore, nitrogen oxides participate in a photochemical reaction and become one of the components of smog, a secondary combined pollution phenomenon. As a result, water which contains nitrogen compounds must be processed for eutrophication. Conventional treatment methods for nitrogen compounds in waste water include biological treatment methods, nitration nitrogen removal methods, breakpoint chlorination methods, ion exchange resin methods, electrodialysis methods, and ammonia stripping methods.

When water containing nitrogen is biologically processed, the contact time required is long because the reaction time is relatively slow. A large-volume biological reaction container becomes necessary, and there is an additional problem of a large amount of excess sludge being generated. Furthermore, although it is possible to process a wide variety of organic nitrogen compounds with biological treatment methods, even minor changes in the configuration of organic nitrogen compounds can cause problems when biological treatment methods are employed.

It is known to process waste water which contains hydrazine by an oxidizing treatment method, wherein the waste water is aerated and oxidized in the presence of copper ion. However, because the reaction speed is slow, about a full day is required for treatment.

In waste water which contains monoethanolamine, a breakdown method which employs a catalyzed reaction is known. However, this method has not been widely adopted in the art.

As shown in the equations (I) and (II) below, ammonia is generated through hydrolysis when an aqueous urea solution is heated. When urea reacts with nitrous acid, the urea is converted to dinitrogen.

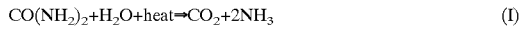

(I)

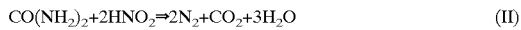

(II)

Hydrazine dissociates when heated to approximately 180 degrees in the presence of air, Generating ammonia and dinitrogen. Also, it is known that ammonia is generated by the heating and subsequent dissociation of monoethanolamine.

However, methods which apply these decomposition reactions of nitrogen compounds to the treatment of waste water are not known. In the reaction between urea and nitrous acid, a large amount of nitrous acid is required if there is a high concentration of urea. This limits the economical application of this method in the treatment of waste water. In waste water which contains a high concentration of nitrogen compounds, it is difficult to achieve an adequate quality of processed water by merely heat treatment. It is possible to process waste water which contains urea by a wet catalytic oxidation method under high temperature/high pressure conditions (such as 200–300° C., 20–100 kg/cm²G). However, this approach is uneconomical, and the conditions are difficult to maintain. Furthermore, even if the nitrogen compounds are completely converted to ammonia, the nitrogen content in the waste water is not reduced. Therefore, further treatment is necessary.

One known method for the physical and chemical treatment method of ammonia is the breakpoint method. The breakpoint method is a method wherein chlorine or sodium hypochlorite is added to waste water which contains ammonia, and the ammonia is removed by oxidizing breakdown into dinitrogen gas. The reactions of the oxidation breakdown treatment of ammonia using the breakpoint method are given below in equations (III) and (IV).

(III)

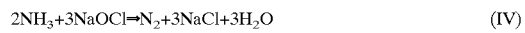

(IV)

The characteristic of the oxidizing breakdown of ammonia by the breakpoint method is that more than the stoichiometrically required amount of chlorine or sodium hypochlorite must be added. Normally, this treatment is conducted under normal temperature and pressure conditions, but the reaction mixture must be left standing for the amount of time required for the reaction to proceed to completion. As a result, in order to make the device in which this method is performed more compact, there has been a demand for new technologies, such as, for example, a reaction accelerating medium. In addition, treatment to remove residual chlorine is required when this method is employed, because excess chorine or sodium hypochlorite remain in the processed water.

Japanese Laid Open Publication No. 5-269475 discloses a method for the the oxidizing breakdown of ammonia by hydrolysis, wherein an ammonia-containing solution is processed under heated conditions to accelerate the reaction. However, if large volumes of waste water which contains ammonia are to be heated, problems of excessive energy usage arise.

OBJECTS AND SUMMARY OF THE INVENTION

The object of the present invention is to provide a treatment method for waste water which contains nitrogen compounds, wherein a chlorine oxidant and/or hydrogen peroxide are used as oxidants for oxidative breakdown of nitrogen compounds in water.

A further object is to provide a treatment method for waste water which contains nitrogen compounds that proceeds under normal temperature and pressure conditions.

A further object is to provide a method for treating waste water which contains nitrogen compounds that exhibits increased reaction speed, and which can be performed in a more compact reaction device.

Yet a further object is to provide a method for treating waste water which contains nitrogen compounds that breaks down and remove excess oxidants remaining in the processed water.

A further object is to provide a method for treating waste water which contains nitrogen compounds that heightens the oxidation efficiency of the oxidants employed in the method, and thereby requires lesser amounts of the oxidants.

Briefly stated, waste water containing nitrogen compounds is processed by adding an oxidant to the waste water. The oxidant may be one or more of a chlorine oxidant or hydrogen peroxide. The oxidant breaks down the nitrogen compounds through a breakpoint reaction. The partially processed water then is contacted with a metal peroxide catalyst. The metal peroxide breaks down and removes excess oxidant. The reaction may be carried out at normal temperature and pressure.

According to an embodiment of the present invention, a method for treating water containing nitrogen compounds comprises steps of adding an oxidant to the water, the oxidant being at least one of a chlorine oxidant, hydrogen peroxide, and a peroxide effective to generate hydrogen peroxide in an aqueous solution, incubating the water containing the oxidant for a period of time sufficient to break down the nitrogen compounds, and after the step of incubating, contacting the water containing the oxidant with a metal peroxide catalyst effective to break down the oxidant.

According to another embodiment of the present invention, a method for treating water containing nitrogen compounds comprises steps of adding an oxidant to the water, the oxidant being at least one of a chlorine oxidant, hydrogen peroxide, and a peroxide effective to generate hydrogen peroxide in an aqueous solution, incubating the water containing the oxidant for a period of time sufficient to break down the nitrogen compounds at a temperature between about 20° C. and about 30° C., and at a pressure that is substantially equal to atmospheric pressure, and after the step of incubating, flowing the water containing the oxidant over a metal peroxide catalyst effective to break down the oxidant at a flow rate such that the method has an SV of between about 0.1 $h^{-1}$ and 60 $h^{-1}$, wherein the metal peroxide catalyst contains a metal peroxide supported on a carrier, the metal peroxide catalyst being at least one of cobalt peroxide, nickel peroxide, copper peroxide, and silver peroxide, and wherein the metal peroxide is between about 0.01% and about 10% by weight of the carrier.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
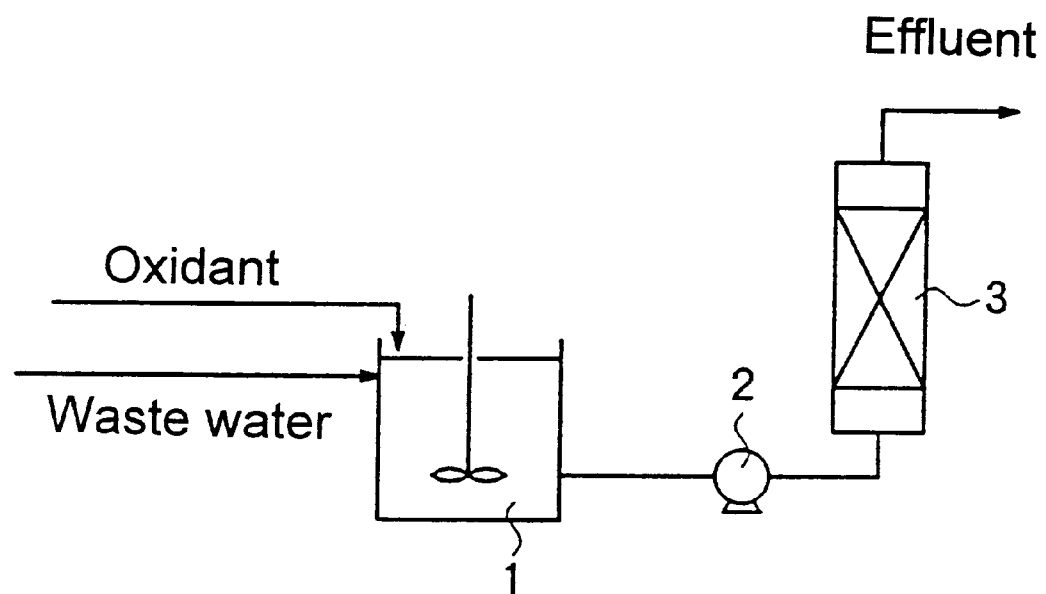
FIG. 1 is a process system diagram of the method of the present invention.

The inventors of the present invention have discovered that by adding a chlorine oxidant or hydrogen peroxide to waste water which contains nitrogen compounds and subsequently bringing the mixture into contact with a metal peroxide catalyst, the oxidation efficiency of the waste water treatment process is dramatically improved.

Nitrogen compounds which can be processed by the present invention include, for example, inorganic nitrogen compounds, such as ammonia or hydrazine; and organic nitrogen compounds, such as urea, ethanolamine, or aniline. Waste water which includes these kinds of nitrogen compounds are discharged from, for example, dye factories, fertilizer factories, semiconductor factories, and electric power plants.

In the present invention, at least one chlorine oxidant or hydrogen peroxide is added to waste water which contains nitrogen compounds. There are no particular limitations to the type of chlorine oxidant, and examples can include: chlorine; hypochlorites, such as sodium hypochlorite, potassium hypochlorite, or calcium hypochlorite; chlorites, such as sodium chlorite or potassium chlorite; chlorates, such as sodium chlorate, potassium chlorate, or calcium chlorate; and perchlorates, such as sodium perchlorate or calcium perchlorate. Among these, hypochlorites are preferred, since hypochlorites have an appropriate amount of oxidizing strength. With regard to peroxides, hydrogen peroxide or any peroxide that generates hydrogen peroxide when dissolved in water can be used.

In the present invention, the amount of chlorine oxidants or hydrogen peroxide added is preferably between about 1.0 and about 1.5 times the stoichiometric amount (or reaction equivalent amount) required for reaction with nitrogen compounds. It is more preferable that an amount between about 1.0 and about 1.2 times the stoichiometric amount be added. If the amount of chlorine oxidant or hydrogen peroxide added is less than the stoichiometric amount, the oxidizing breakdown of nitrogen compounds is dramatically lowered, and the breakdown of the nitrogen compounds in the water may be incomplete. In theory, by adding chlorine oxidant or hydrogen peroxide at a stoichiometric amount with respect to the nitrogen compounds, the nitrogen compounds in the water should be completely broken down. However, chlorine oxidants or hydrogen peroxides can be consumed if other substances which coexist in the water react with the oxidizing compounds. As a result, in the method of the present invention, it is preferable to add a slight excess over the stoichiometric amount. If the amount of chlorine oxidants or hydrogen peroxides added exceeds 1.5 times the stoichiometric amount, the breakdown rate of the nitrogen compounds does not further increase in a proportional manner.

The reaction equivalent amounts of nitrogen compounds and chlorine oxidant or hydrogen peroxide to be added can be calculated from the following example reaction equations (V) through (XV). In other words, the amount of sodium hypochlorite which corresponds to 1.0–1.5 times the reaction equivalent amount of ammoniac nitrogen would be 8.0–12.0 times the weight of ammoniac nitrogen. The amount of hydrogen peroxide which corresponds to 1.0–1.5 times the reaction equivalent amount of ammoniac nitrogen would be 3.6–5.5 times the weight of ammoniac nitrogen.

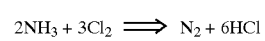
(V)

(VI)

-continued $$N_2H_4 + 2NaOCl \Longrightarrow N_2 + 2H_2O + 2NaCl \qquad (VII)$$

$$CO(NH_2)_2 + 3NaOCl \Longrightarrow N_2 + 2H_2O + CO_2 + 3NaCl \qquad (VIII)$$

$$2NH_2CH_2CH_2OH + 13NaOCl \Longrightarrow N_2 + 7H_2O + 4CO_2 + 13NaCl \qquad (IX)$$

$$2C_6H_5NH_2 + 31NaOCl \Longrightarrow N_2 + 7H_2O + 12CO_2 + 31NaCl \qquad (X)$$

$$2NH_3 + 3H_2O_2 \Longrightarrow N_2 + 6H_2O \qquad (XI)$$

$$N_2H_4 + 2H_2O_2 \Longrightarrow N_2 + 4H_2O \qquad (XII)$$

$$CO(NH_2)_2 + 3H_2O_2 \Longrightarrow N_2 + 5H_2O + CO_2 \qquad (XIII)$$

$$2NH_2CH_2CH_2OH + 13H_2O_2 \Longrightarrow N_2 + 20H_2O + 4CO_2 \qquad (XIV)$$

$$2C_6H_5NH_2 + 31H_2O_2 \Longrightarrow N_2 + 38H_2O + 12CO_2 \qquad (XV)$$

In the present invention, breakdown treatment of waste water containing nitrogen compounds can occur by adding a chlorine oxidant or hydrogen peroxide to the waste water, and thereafter bringing the waste water into contact with a metal peroxide catalyst. Under these conditions, the breakdown reactions presented in the above equations progress rapidly under normal temperature and pressure conditions, and the nitrogen compounds in the water are broken down and removed.

Examples of metal peroxide catalysts which may be used in the present invention include cobalt peroxide, nickel peroxide, copper peroxide, silver peroxide, and the like. It is even more preferable if these metal peroxide catalysts are supported by a carrier, such as zeolite, titania, γ-alumina, α-alumina, or the like. The preparation method for these are described below, using the example of zeolite as the carrier and cobalt peroxide as the carried catalyst.

Zeolite is an aluminosilicate which has uniform fine pores of molecular size. The structure of zeolite is a series of tetrahedrons of silicon atoms, with a portion substituted by aluminum atoms, which form a three dimensional mesh structure via oxygen atoms. Characteristic hollows and channels are formed. The size of these hollows or channels are determined by the size of the oxygen ring. Zeolite typically has an ability to replace cations. In the present invention, natural zeolites, such as clinoptiololite or mordenite, or synthetic zeolites, such as zeolite A, zeolite X, or zeolite Y can be used with good results. These zeolites may be used singly, or two or more types may be mixed and used.

The treatment of the zeolite is conducted by bringing it into contact with aqueous solutions of sulfates, nitrates, or chlorides of cobalt, or mixture solutions of these. One method of contact involves soaking particles of zeolite in the solution. Alternatively, zeolite particles can be packed into a column and the aqueous solution can be passed through once or in a circulating manner. The concentration of cobalt salt and contact times are determined so that the necessary amount of cobalt is retained by the zeolite. The amount of cobalt which is carried is preferably between about 0.01% and about 10% by weight. The thus-processed zeolite is then rinsed with water as needed after being separated from the aqueous solution. A rinsing step is desirable to remove all cobalt ions not present in the active sites of zeolite. Generally, it is preferable to rinse until the color of cobalt ions disappear from the rinse water. By this procedure, it is possible to obtain an effective zeolite carrier bearing a minimal amount of cobalt.

Next, the zeolite carrier obtained as above is brought into contact with an alkaline aqueous solution which contains chlorine agents. As a method of contact, zeolite can be soaked in the alkaline solution which contains chlorine agents. Alternatively, zeolite can be packed into a column, and the alkaline solution containing chlorine agents can be passed through once or in a circulating manner. In this manner, the cobalt peroxide catalyst used in the present invention is obtained. At the time of contact, a small amount of cobalt ions may separate from zeolite and generate a fine precipitate in the peroxide, but the precipitate can be removed through final rinsing. Examples of chlorine agents include chemicals which generate free chlorine (i.e., sodium hypochlorite, chlorine gas, chlorine generated by electrolysis, and the like). Examples of the alkaline aqueous solution which is used in conjunction with the chlorine agent include aqueous solutions of sodium hydroxide, potassium hydroxide, and the like.

As an alternative method of formation of the cobalt peroxide catalyst, the zeolite may be heated after the rinsing step, causing the cobalt ion to change to cobalt oxide. Then, the zeolite carrier is brought into contact with an alkaline solution, and the same catalyst is obtained.

In the present invention, nitrogen compounds in waste water to which a chlorine oxidant or hydrogen peroxide has been added are broken down by contacting the waste water with a metal peroxide catalyst as prepared above. The catalyst, packed as particles of diameter about 0.3 to about 10 mm into a column, can be used as a fixed bed or a fluid bed. If the particle diameter is less than 0.3 mm, the loss of pressure becomes too great in a fixed bed. Similarly, if the particle diameter is less than 0.3 mm, there is a danger that the carrier will be destroyed and become mixed in with the processed water in a fluid bed. The direction of water flow may be either upward or downward. However, since nitrogen gas is generated in the reactions of the present invention, upward flow is preferred.

In the method of the present invention, the rate of water flow can be chosen so that it is appropriate for the contact method or the amount of metal peroxide held by the carrier. Typically, it is preferable to have an SV of between about 0.1 $h^{-1}$ and about 60 $h^{-1}$. SV refers to space velocity, and is the ratio of the flow rate of the inflow to the volume of the processing device. For example, if the inflow has a flow rate of 2 liter/hr, and the volume of the process device is one liter, the SV is 2 $h^{-1}$. It is even more preferable to have an SV of between 0.5 $h^{-1}$ and 20 $h^{-1}$. Even more preferable is an SV of between 1 $h^{-1}$ and about 10 $h^{-1}$. The contact between the waste water, which contains nitrogen compounds and to which a chlorine oxidant or hydrogen peroxide has been added, and the metal peroxide catalyst is typically conducted at normal temperature of between about 20 and 30° C. The reaction rate is increased if the reaction is performed at a higher temperature, between about 40 and 50° C., and the contact time can correspondingly be shortened. Generally, if the nitrogen compound concentration in the waste water is high, it is preferable to increase the contact time. Furthermore, if the contact time is too short, there is a danger that residual chlorine oxidant or hydrogen peroxide will remain in the processed water.

In the present invention, it is preferable to have the pH of the waste water which contains nitrogen compounds above 6, and it is even more preferable to have the pH over 7. It is still more preferable to have the pH between 7 and 11. If the pH of the water which contains nitrogen compounds is less than 6, there is a danger that small amounts of supported metal can dissolve.

By the present invention, the oxidative breakdown of nitrogen compounds in waste water can proceed at a rapid reaction rate under normal temperature and pressure conditions, using an amount of chlorine oxidants or hydrogen peroxide that is close to the stoichiometric amount. The reaction device for performing the oxidation breakdown can be made compact, and a processed water of a stable water quality can be obtained.

Referring to FIG. 1, a process system diagram of one embodiment of the present invention is shown. In mixing container 1, chlorine oxidants or hydrogen peroxide are added to water which contains nitrogen compounds, and this solution is uniformly mixed. The nitrogen compounds in the waste water are broken down at this step. The waste water solution is next sent to catalyst packed column 3 by pump 2. The water contacts the metal peroxide catalyst under normal temperature and pressure conditions, and a high-quality processed water is obtained.

In conventional methods wherein nitrogen compounds are reacted with chlorine oxidants or the like in the absence of a metal peroxide catalyst, the reaction rates are slow, and a long time is necessary for the reaction to proceed to completion. During this extended incubation time, the oxidants are broken down and/or consumed. As a result, there is a need to add at least about 1.3 to 2 times of the stoichiometric amount of the oxidant.

By the present invention, the amount of chlorine oxidants or hydrogen peroxide required to be added is slightly over the stoichiometric amount, and there is no need for a large excess, as in the prior art. The reaction proceeds rapidly to completion. Because the volume of reaction mixture is minimized, nitrogen compounds can be removed at a high removal rate using a small device. Furthermore, with the present invention, the excess oxidants do not remain in the processed water because the metal peroxide catalyst breaks down the oxidants. Additionally, wasteful breakdown of oxidants is minimized with the present invention, because the supplied oxidants preferentially react with nitrogen compounds, rather than being broken down by metal peroxide catalysts.

EMBODIMENT 1

A cylindrical column of inner diameter 21 mm was packed with 50 ml (approximately 39 g) of spherical X zeolite. The zeolite particles had a diameter between 2–3 mm, and supported an amount of cobalt peroxide which corresponded to 2% by weight of cobalt. This was the reaction column.

A synthetic waste water was prepared by dissolving ammonium sulfate in water to an ammoniac nitrogen concentration of 1,000 mg/liter. This was the source water. Varying amounts of sodium hypochlorite solution were added to samples of the source water to final sodium hypochlorite concentrations of 5,600 mg/liter, 8,000 mg/liter, and 10,500 mg/liter. These amounts of sodium hypochlorite added corresponded to 0.7 times, 1.0 times, and 1.3 times the reaction equivalent, respectively. The pH of the solutions after sodium hypochlorite addition ranged between 10.5 and 11.

These solutions were passaged through the above reaction column at 25° C. and a flow rate of 150 ml/h (SV=3 h$^{-1}$). The ammoniac nitrogen concentrations in the solutions were measured. When 5,600 mg/liter of sodium hypochlorite was added, the ammoniac nitrogen removal rate was 61%; when 8,000 mg/liter was added, the removal rate was 92%; and when 10,500 mg/liter was added, the removal rate was 94%. Furthermore, no residual chlorine was detected in the processed water of any of these experimental solutions.

COMPARISON 1

The experiments of Embodiment 1 were repeated, except that the reaction solutions were passaged through a column filled with spherical glass beads of diameter 2–3 mm, in place of the cobalt peroxide catalyst column. When 5,600 mg/liter of sodium hypochlorite was added, the removal rate of ammoniac nitrogen was 35%; when 8,000 mg/liter was added, the removal rate was 49%; and when 10,500 mg/liter was added, the removal rate was 78%. Furthermore, in each case, there was at least 2,000 mg/liter of residual chlorine detected in the processed water.

Figure 2:
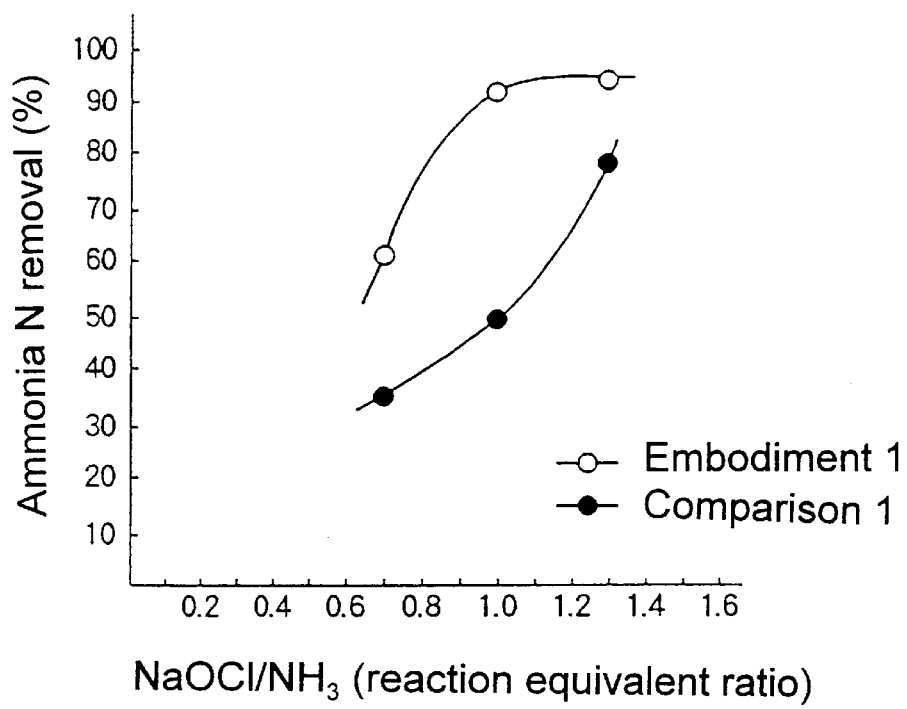
FIG. 2 is a graph which shows the relationship between the amount of sodium hypochlorite added and the removal rate of ammoniac nitrogen.

Referring to Table 1 and FIG. 2, the results of Embodiment 1 and Comparison 1 are shown. When the amount of added sodium hypochlorite was greater than the reaction equivalent of ammoniac nitrogen, the removal rate of ammoniac nitrogen was at least 92%. However, if the amount of sodium hypochlorite which was added was less than the reaction equivalent, the removal rate of ammoniac nitrogen rapidly declined.

In contrast, if glass beads were used in place of the supported cobalt peroxide catalyst, the removal rate of ammoniac nitrogen was much lower, and residual chlorine remained in the processed water.

TABLE 1

| NaOCl/NH$_3$ reaction equivalent ratio | Ammoniac nitrogen removal (%) | |
| --- | --- | --- |
| | Embodiment 1 | Comparison 1 |
| 0.7 | 61 | 35 |
| 1.0 | 92 | 49 |
| 1.3 | 94 | 78 |

EMBODIMENT 2

The same operations as in Embodiment 1 were employed, except hydrogen peroxide was added in place of sodium hypochlorite to final concentrations of 2,500 mg/l, 3,650 mg/l, and 4,750 mg/l. These amounts of hydrogen peroxide added corresponded to 0.7 times, 1.0 times, and 1.3 times the stoichiometric amount, respectively. The pH of the solutions after hydrogen peroxide was added ranged between 7 and 8. The solutions were then passaged through a reaction column filled with supported cobalt peroxide catalyst. The amounts of remaining ammoniac nitrogen were then measured as in Embodiment 1. The results are shown in Table 1 and FIG. 2.

When 2,500 mg/l hydrogen peroxide was added, the ammoniac nitrogen removal rate was 50%. When 3,650 mg/l of hydrogen peroxide was added, the removal rate was 74%, and for 4,750 mg/liter, the removal rate was 76%. Furthermore, in all cases, no hydrogen peroxide was detected in the processed water (not shown).

COMPARISON 2

The experiments of Embodiment 2 were repeated, except that the reaction solutions were passaged through a column filled with spherical glass beads of diameter 2–3 mm, in place of the supported cobalt peroxide catalyst column.

The ammoniac nitrogen removal rate of the processed water after being passed through the reaction column filled with glass beads was: 42% for 2,500 mg/liter of hydrogen peroxide, 43% for 3,650 mg/liter, and 49% for 4,750 mg/l. In each of the cases of Embodiment 2, there were at least several hundred mg/liter of hydrogen peroxide remaining in the processed water (not shown).

Figure 3:
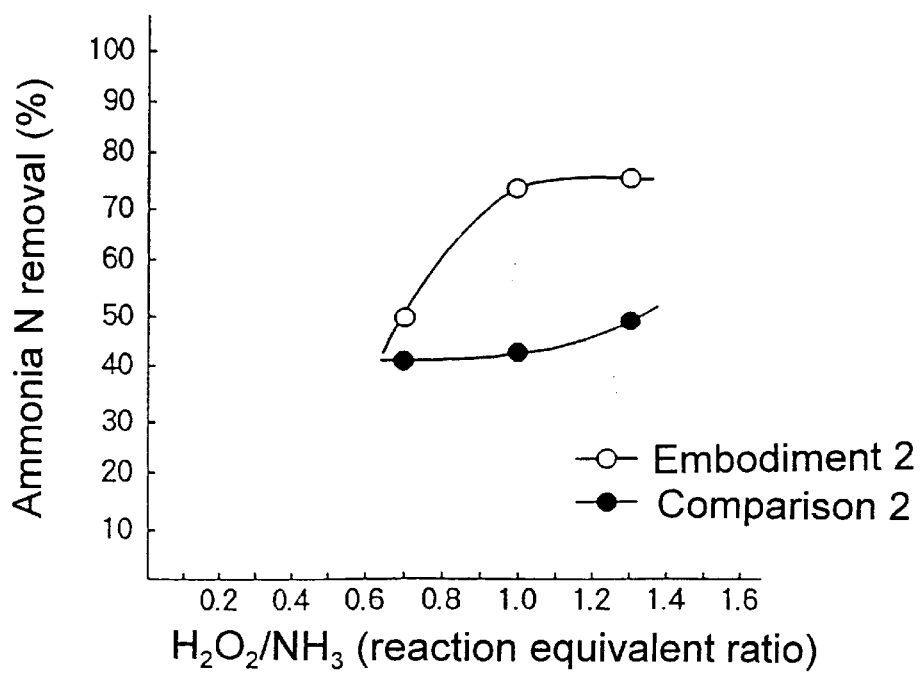
FIG. 3 is a graph which shows the relationship between the amount of hydrogen peroxide added and the removal rate of ammoniac nitrogen.

Referring to Table 2 and FIG. 3, the results of embodiment 2 and comparison 2 are shown. It can be seen that if the amount of hydrogen peroxide which was added was greater than the stoichiometric amount, the ammoniac nitrogen removal rate was at least 74%. If the amount of hydrogen peroxide was less than the stoichiometric amount, the removal rate of ammoniac nitrogen was substantially reduced.

If glass beads were used instead of the cobalt peroxide catalyst, the removal rate of ammoniac nitrogen was much lower, at the same amount of hydrogen peroxide. There was also hydrogen peroxide remaining in the processed water (not shown).

TABLE 2

| $H_2O_2/NH_3$ reaction equivalent ratio | Ammoniac nitrogen removal (%) | |
|---|---|---|
| | Embodiment 1 | Comparison 1 |
| 0.7 | 50 | 42 |
| 1.0 | 74 | 43 |
| 1.3 | 76 | 49 |

EMBODIMENT 3

A cylindrical column of inner diameter 21 mm was packed with 50 ml (approximately 39 g) of spherical X zeolite. The zeolite particles had a diameter between 2–3 mm, and supported an amount of cobalt peroxide which corresponded to 2% by weight of cobalt. This was the reaction column.

Sodium hypochlorite was added to waste water which contained urea. The concentrations of total organic carbon, total nitrogen, and ammoniac nitrogen were measured. The waste water containing urea had the following water quality: total organic carbon 800 mg/l, total nitrogen 480 mg/liter, and ammoniac nitrogen less than 100 mg/liter. To this waste water, 95.7 ml/liter of a 10% (by weight) aqueous solution of sodium hypochlorite was added.

This solution was passaged through the reaction column at 25° C., at normal pressure, and at a flow rate of 150 ml/h (SV 3 $h^{-1}$). The water quality of the processed water was as follows: total organic carbon 280 mg/liter, total nitrogen 3.4 mg/liter, and ammoniac nitrogen was not detectable.

EMBODIMENT 4

The waste water solution of a fourth embodiment had the following water quality: total organic carbon 1,550 mg/liter; total nitrogen 900 mg/liter; and ammoniac nitrogen 100 mg/liter or less. To this solution 185.5 ml/liter of a 10% (by weight) solution of sodium hypochlorite was added. This was passaged through a reaction column as in Embodiment 3.

The water quality of the processed water derived from this waste water was as follows: total organic carbon 7.7 mg/liter, total nitrogen 4.5 mg/liter, and ammoniac nitrogen was not detectable.

EMBODIMENT 5

The waste water solution of a fifth embodiment had the following water quality: total organic carbon 1,400 mg/liter, total nitrogen 780 mg/liter, and ammoniac nitrogen 100 mg/liter or less. To this waste water solution was added 166.7 ml/liter of a 10% (by weight) solution of sodium hypochlorite. This was passaged through a reaction column as in Embodiment 3.

The water quality of the processed water derived from this waste water was as follows: total organic carbon 9.4 mg/liter; total nitrogen 3.9 mg/liter; and ammoniac nitrogen was not detectable.

Referring to Table 3, the results of Embodiments 3–5 are shown. Waste water treated by the method of the present invention produced processed water samples having greatly improved water quality. The total organic carbon in the processed water was reduced to below 10 mg/liter in Embodiments 4 and 5. In Embodiment 3, the total organic carbon was not reduced to the same degree, but was still lowered substantially. Furthermore, in all three embodiments, the total nitrogen was reduced to less than 5 mg/liter, and the ammoniac nitrogen was below the detectable limit.

TABLE 3

| | Embodiment 3 | | Embodiment 4 | | Embodiment 5 | |
|---|---|---|---|---|---|---|
| | Influent | Effluent | Influent | Effluent | Influent | Effluent |
| Total organic carbon (mg/l) | 800 | 280 | 1550 | 7.7 | 1400 | 9.4 |
| Total nitrogen (mg/l) | 480 | 3.4 | 900 | 4.5 | 780 | 3.9 |
| Ammoniac nitrogen (mg/l) | <100 | ND | <100 | ND | <100 | ND |
| NaOCl solution (ml/l) | 95.7 | | 185.5 | | 166.7 | |

ND = not detectable

EMBODIMENT 6

Sodium hypochlorite was added to a source water which contained 1,100 mg/liter of monoethanolamine. The concentrations of total nitrogen, ammoniac nitrogen, total organic carbon, and oxygen demand by potassium permanganate at 100° C. ($COD_{Mn}$) were measured.

A cylindrical column of inner diameter 21 mm was packed with 50 ml (approximately 39 g) of spherical X zeolite. The zeolite particles had a diameter between 2–3 mm, and supported an amount of cobalt peroxide which corresponded to 2% by weight of cobalt. This was the reaction column.

The source water of the sixth embodiment had the following water quality: total nitrogen 250 mg/liter, total organic carbon 430 mg/liter, and $COD_{Mn}$ 380 mg/liter. Ammoniac nitrogen was not detectable. To this source water, sodium peroxide was added to a final concentration of 8,300 mg/liter.

This solution was passaged through the reaction column at 25° C. and at a flow rate of 200 ml/h (SV 4 $h^{-1}$). The water quality of the processed water was as follows: total nitrogen 42 mg/liter, total organic carbon 13 mg/liter, $COD_{Mn}$ 6 mg/liter, and ammoniac nitrogen 0.7 mg/liter.

EMBODIMENT 7

Sodium hypochlorite was added to a source water which contained 1,100 mg/liter of monoethanolamine and 100 mg/liter of hydrazine. This was processed in the same manner as Embodiment 6. The concentrations of total nitrogen, ammoniac nitrogen, total organic carbon, and $COD_{Mn}$ were measured.

The water quality of the source water was as follows: total nitrogen 340 mg/liter; total organic carbon 430 mg/liter, and $COD_{Mn}$ 460 mg/liter. Ammoniac nitrogen was below detectable limits. Sodium hypochlorite was added to this source solution to a final concentration of 9,000 mg/liter. This solution was passaged through the reaction column at 25° C. and a flow rate of 200 ml/h (SV 4 $h^{-1}$).

The water quality of the processed water was as follows: total nitrogen 43 mg/liter; total organic carbon 15 mg/liter; $COD_{Mn}$ 8 mg/liter; and ammoniac nitrogen 0.8 mg/liter.

EMBODIMENT 8

Sodium hypochlorite was added to a source water which contained 300 mg/liter of aniline. This was processed in the same manner as Embodiment 6. The concentrations of total nitrogen, ammoniac nitrogen, total organic carbon, and $COD_{Mn}$ were measured.

The water quality of the source water was as follows: total nitrogen 45 mg/liter; total organic carbon 230 mg/liter, and $COD_{Mn}$ 690 mg/liter. Ammoniac nitrogen was below detectable limits. Sodium hypochlorite was added to this source water to a final concentration of 4,460 mg/liter. This was passaged through a reaction column at 25° C. and at a flow rate of 100 ml/h (SV 2 $h^{-1}$).

The water quality of the processed water was as follows: total nitrogen 4 mg/liter, total organic carbon 16 mg/liter, $COD_{Mn}$ 28 mg/liter, and ammoniac nitrogen 0.6 mg/liter.

Referring to Table 4, the results from Embodiments 5–8 are shown. It can be seen that total nitrogen, total organic carbon, and $COD_{Mn}$ were all substantially reduced when aliphatic amines (monoethanolamine), aromatic amines (aniline), or inorganic nitrogen compounds (hydrazine) were present. Therefore, the present invention is effective in treatment of water containing a variety of nitrogen compounds.

of the processed water is further improved. Furthermore, the setup required for the method of the present invention is compact, and little space is needed for installation.

Having described preferred embodiments of the invention with reference to the accompanying drawings, it is to be understood that the invention is not limited to those precise embodiments, and that various changes and modifications may be effected therein by one skilled in the art without departing from the scope or spirit of invention as defined in the appended claims.

What is claimed is:

1. A method for treating water containing nitrogen compounds, comprising the steps of:
    adding an oxidant to said water, said oxidant being at least one member selected from the group consisting of a chlorine oxidant, hydrogen peroxide, and a peroxide effective to generate hydrogen peroxide in an aqueous solution; and
    after said adding step, contacting said water containing said oxidant with a cobalt peroxide catalyst
    wherein said cobalt peroxide is supported on a zeolite carrier.

2. A method for treating water containing nitrogen compounds according to claim 1, wherein said oxidant is at least one member selected from the group consisting of chlorine, sodium hypochlorite, potassium hypochlorite, calcium hypochlorite, sodium chlorite, potassium chlorite, sodium chlorate, potassium chlorate, calcium chlorate, sodium perchlorate and calcium perchlorate.

3. A method for treating water containing nitrogen compounds according to claim 1, wherein an amount of said oxidant added is between about 1.0 and 1.5 times a stoichiometric amount required for reaction with said nitrogen compounds.

4. A method for treating water containing nitrogen compounds according to claim 1, wherein an amount of said oxidant added is between about 1.0 and 1.2 times a stoichiometric amount required for reaction with said nitrogen compounds.

5. A method for treating water according to claim 1, wherein said cobalt peroxide is between about 0.01% and about 10% by weight of said zeolite carrier.

TABLE 4

|  | Embodiment 6 | | | Embodiment 7 | | | Embodiment 8 | | |
| --- | --- | --- | --- | --- | --- | --- | --- | --- | --- |
|  | Influent | Effluent | Removal (%) | Influent | Effluent | Removal (%) | Influent | Effluent | Removal (%) |
| Total organic carbon (mg/l) | 430 | 13 | 97 | 430 | 15 | 97 | 230 | 16 | 93 |
| Total nitrogen (mg/l) | 250 | 42 | 83 | 340 | 43 | 87 | 45 | 4 | 91 |
| Ammoniac nitrogen (mg/l) | ND | 0.7 | — | ND | 0.8 | — | ND | 0.6 | — |
| $COD_{Mn}$ (mg/l) | 380 | 6 | 98 | 460 | 8 | 98 | 690 | 28 | 96 |
| Nitrogen compounds (mg/l) | Monoethanolamine (1100) | | | Monoethanolamine (1100) + Hydrazine (100) | | | Aniline (300) | | |
| NaOCl solution (ml/l) | 8300 | | | 9000 | | | 4460 | | |

ND = not detectable

By the method of the present invention, waste water which contains nitrogen compounds can be readily processed at normal temperature and pressure. A high quality processed water having a low nitrogen concentration, low total organic carbon concentration and low chemical oxygen demand can be obtained. Furthermore, excess chlorine oxidant or hydrogen peroxide is broken down and does not remain in the processed water. As a result, the water quality 6. A method for treating water according to claim 1, wherein said metal peroxide catalyst includes catalyst particles, said catalyst particles having a diameter between about 0.3 mm to about 10 mm.

7. A method for treating water according to claim 6, wherein said catalyst particles are arranged in a column in one of a fixed bed and a fluid bed.

8. A method for treating water according to claim 1, further comprising flowing said water over said cobalt peroxide catalyst at a flow rate such that said method has an SV of between about 0.1 $h^{-1}$ and 60 $h^{-1}$.

9. A method for treating water according to claim 1, wherein said method is performed at a temperature between about 20° C. and about 30° C., and at a pressure that is substantially equal to atmospheric pressure.

10. A method for treating water containing nitrogen compounds according to claim 1, wherein said nitrogen compounds is at least one member selected from the group consisting of urea, aniline, alkanolamine and protein.

11. A method for treating water containing organic nitrogen compounds, comprising the steps of:

adding an oxidant to said water, said oxidant being at least one member selected from the group consisting of a chlorine oxidant, hydrogen peroxide, and a peroxide effective to generate hydrogen peroxide in an aqueous solution; and after said adding step, flowing said water containing said oxidant over a cobalt peroxide catalyst at a flow rate such that said method has an SV of between about 0.1 $h^{-1}$ and 60 $h^{-1}$, at a temperature between about 20° C. and about 30° C., and a pressure that is substantially equal to atmospheric pressure, wherein said cobalt peroxide catalyst contains a cobalt peroxide supported on a zeolite, and wherein said cobalt peroxide is between about 0.01% and about 10% by weight of said zeolite.

12. A method for treating water containing organic nitrogen compounds according to claim 11, wherein said organic nitrogen compounds is at least one member selected from the group consisting of urea, aniline, alkanolamine and protein.

13. A method for treating water containing nitrogen compounds, comprising steps of:

adding an oxidant to said water; and after said adding step, contacting said water containing said oxidant with a cobalt peroxide catalyst effective to break down said oxidant, said cobalt peroxide catalyst being supported on a zeolite carrier.

* * * * *